(12) United States Patent
Clark et al.

(10) Patent No.: US 10,228,023 B2
(45) Date of Patent: Mar. 12, 2019

(54) BEARING OUTER RACE OIL SUPPLY FOR THIN FILM FLUIDIC DAMPING

(71) Applicant: United Technologies Corporation, Hartford, CT (US)

(72) Inventors: Thomas E. Clark, Sanford, ME (US); Eric Charles Mundell, South Berwick, ME (US); Gary L. Grogg, South Berwick, ME (US)

(73) Assignee: United Technologies Corporation, Farmington, CT (US)

( * ) Notice: Subject to any disclaimer, the term of this patent is extended or adjusted under 35 U.S.C. 154(b) by 165 days.

(21) Appl. No.: 15/076,783

(22) Filed: Mar. 22, 2016

(65) Prior Publication Data

US 2016/0238075 A1 Aug. 18, 2016

Related U.S. Application Data

(63) Continuation of application No. PCT/US2014/059663, filed on Oct. 8, 2014.

(60) Provisional application No. 61/915,943, filed on Dec. 13, 2013.

(51) Int. Cl.
| | |
|---|---|
| *F16C 33/66* | (2006.01) |
| *F16C 27/04* | (2006.01) |
| *F01D 25/16* | (2006.01) |
| *F16F 15/023* | (2006.01) |
| *F16C 19/26* | (2006.01) |
| *F16C 33/58* | (2006.01) |

(52) U.S. Cl.
CPC ........ *F16C 33/6677* (2013.01); *F16C 27/045* (2013.01); *F16F 15/0237* (2013.01); *F01D 25/164* (2013.01); *F16C 19/26* (2013.01); *F16C 33/581* (2013.01); *F16C 2360/23* (2013.01)

(58) Field of Classification Search
CPC .. F16C 27/045; F16C 33/6677; F16C 33/581; F16C 19/26; F16C 2360/23; F16F 15/0237; F01D 25/164
See application file for complete search history.

(56) References Cited

U.S. PATENT DOCUMENTS

| | | | |
|---|---|---|---|
| 3,722,967 A | 3/1973 | Lewis | |
| 4,527,911 A * | 7/1985 | Davis | F01D 25/18 384/471 |
| 4,838,028 A * | 6/1989 | Witt | F01D 25/125 384/99 |
| 4,981,415 A * | 1/1991 | Marmol | F01D 25/164 384/215 |

(Continued)

FOREIGN PATENT DOCUMENTS

JP 09217741 A * 8/1997 ............ F16C 27/045

OTHER PUBLICATIONS

Machine Translation of JP 09217741 dated Aug. 1997.*

(Continued)

*Primary Examiner* — Alan B Waits
(74) *Attorney, Agent, or Firm* — Snell & Wilmer L.L.P.

(57) ABSTRACT

An improved film damper oil delivery pathway from an oil reservoir to a thin film fluidic damper is provided. An oil supply tube may be configured to mate to a bearing outer race. The bearing outer race may comprise internal oil flow circuit(s) configured to supply oil from the oil tube to the thin film damper for improved bearing compartment designs.

14 Claims, 5 Drawing Sheets

(56) References Cited

U.S. PATENT DOCUMENTS

| | | | | |
|---|---|---|---|---|
| 4,983,051 | A | * | 1/1991 | Hibner .................. F01D 25/164 |
| | | | | 184/6.11 |
| 5,106,208 | A | | 4/1992 | Bobo et al. |
| 5,110,257 | A | * | 5/1992 | Hibner .................. F01D 25/164 |
| | | | | 415/119 |
| 7,574,854 | B2 | * | 8/2009 | Moniz .................. F01D 25/164 |
| | | | | 384/474 |
| 2004/0022463 | A1 | * | 2/2004 | Dusserre-Telmon ........................ |
| | | | | F16C 27/045 |
| | | | | 384/99 |
| 2010/0172739 | A1 | | 7/2010 | Arnold |
| 2011/0052388 | A1 | | 3/2011 | Mavrosakis et al. |

OTHER PUBLICATIONS

International Preliminary Report on Patentability dated Jun. 14, 2016 in Application No. PCT/US2014/059663.
International Search Report and Written Opinion dated Jan. 22, 2015 in Application No. PCT/US2014/059663.

* cited by examiner

BEARING OUTER RACE OIL SUPPLY FOR THIN FILM FLUIDIC DAMPING

CROSS-REFERENCE TO RELATED APPLICATIONS

This application is a continuation of, claims priority to and the benefit of, PCT/US2014/059663 filed on Oct. 8, 2014 and entitled "BEARING OUTER RACE OIL SUPPLY FOR THIN FILM FLUIDIC DAMPING," which claims priority from U.S. Provisional Application No. 61/915,943 filed on Dec. 13, 2013 and entitled "BEARING OUTER RACE OIL SUPPLY FOR THIN FILM FLUIDIC DAMPING." Both of the aforementioned applications are incorporated herein by reference in their entirety.

GOVERNMENT LICENSE RIGHTS

The inventions described herein were made with government support under contract No. FA8650-09-D-2923-AETD awarded by the U.S. Air Force. The government has certain rights in these inventions

FIELD

The present disclosure relates to thin film damper systems.

BACKGROUND

Fluidic damping is generally beneficial between moving parts of machinery and/or equipment. Damping may be provided by a fluid, such as an oil. Thin film damper oil may be supplied in closed systems and in open systems. In open systems, a source may provide a supply of fluid to a desired damper destination.

SUMMARY

A system and method for an improved film damping oil delivery pathway from an oil supply to a thin film fluidic damper is provided. An oil supply tube may be configured to mate to a bearing outer race. Bearing outer race may comprise an internal oil flow circuit (or circuits) configured to supply oil from the oil tube to the thin film damper.

A method of providing oil to a thin film damper is described herein. The method may include coupling a portion of the thin film damper to an oil supply via an internal oil flow circuit, wherein the internal oil flow circuit is at least partially formed internal to a bearing outer race.

The internal oil flow circuit may be integral to the bearing outer race. The method may include coupling an oil supply tube to the internal oil flow circuit, wherein the coupling is configured to couple the internal oil flow circuit to the oil supply.

The internal oil flow circuit may include at least one of a port, bossed port and a plug configured to mate with the oil supply tube. The method may comprise positioning a seal between the oil supply tube and the internal oil flow circuit. An oil pump may be configured to deliver oil from the oil supply to the thin film damper. The internal oil flow circuit may include a plurality of branching oil delivery pathways. The bearing outer race may be separate part from a bearing housing. The oil may be supplied inboard of the thin film damper.

A bearing assembly comprising a thin film damper positioned at least partially between a bearing housing and a bearing outer race is described herein. Oil may be supplied to the thin film damper via an internal oil flow circuit, wherein the internal oil flow circuit is integral to the bearing outer race. An oil supply tube may be configured to couple the internal oil flow circuit to an oil supply.

The internal oil flow circuit may comprise at least one of a port, bossed port, and a plug configured to mate with the oil supply tube. A seal may be coupled between the oil supply tube and the internal oil flow circuit. An oil pump may be configured to deliver oil from the oil supply to the thin film damper. The internal oil flow circuit may comprise a plurality of branching oil delivery pathways. The bearing outer race may be a separate part from the bearing housing. The system may comprise a rolling bearing. The system may comprise a bearing inner race. The oil may be supplied inboard of the thin film damper. The bearing assembly may be configured for aerospace applications.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Different cross-hatching and/or surface shading may be used throughout the figures to denote different parts but not necessarily to denote the same or different materials.

Figure 1:
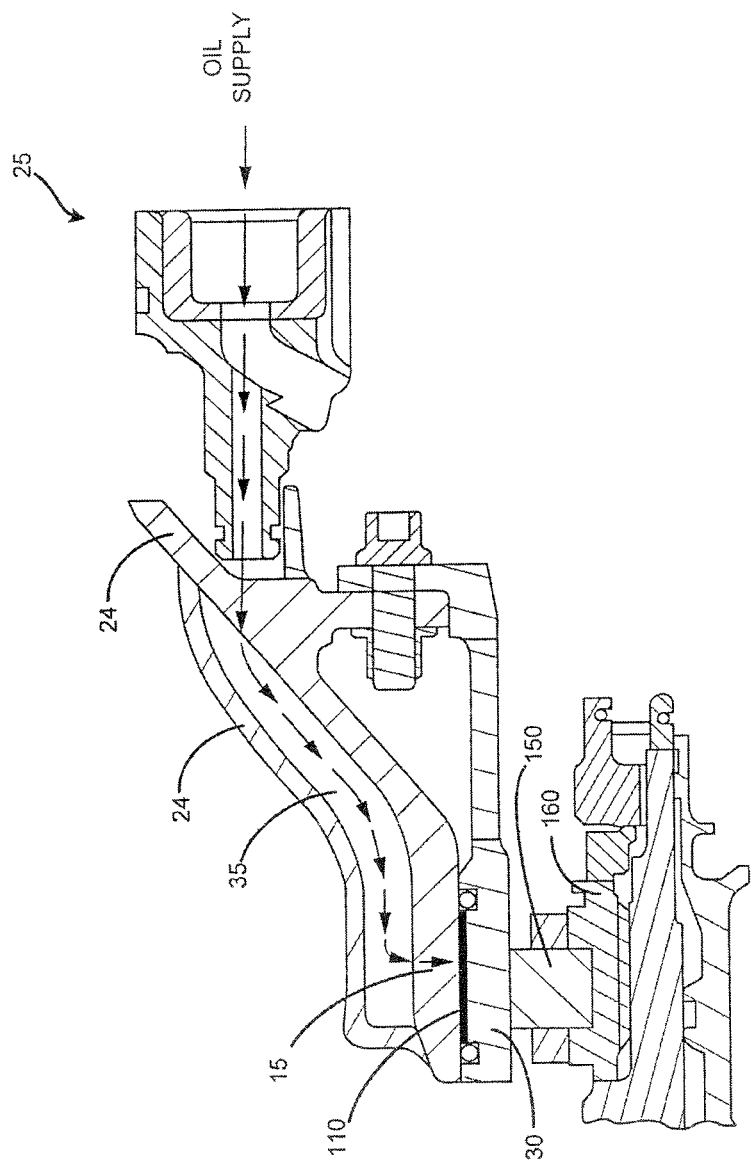
FIG. 1 depicts a cross-sectional view of a first traditional oil damper oil supply delivery path.

With reference to FIG. 1 a traditional thin film damper 110 oil delivery pathway 25 is provided. Thin film dampers 110 (may be referred to as the thin film gap and/or thin film fluidic damper) may be configured to dampen rotor vibrations, such as through a bearing assembly. In general, thin film dampers 110 utilize a thin film of oil for damping provided to a plurality of cylindrical surfaces. Substantially constant oil pressurization is generally provided to the thin film damper 110 from a supply reservoir. Oil may be provided to the thin film damper 110 through a nozzle. As depicted in FIG. 1, the oil supply may be provided via a cast passage 35 that travels through the outboard bearing support 24. This cast passage 35 through the outboard bearing support 24 is generally through a conduit 15 machined in the outboard bearing support 24, formed by drilling the conduit 15 through the outboard bearing support 24. The thin film damper 110 may be located between the outboard bearing support 24 and bearing outer race 30 or between a centering spring 31 and a bearing support 24. In general, the rolling-elements of a bearing assembly may ride on races. The generally larger diameter race is referred to as the outer race, and the smaller diameter race (often coupled to a shaft) is referred to as the inner race. The bearing 150 may be housed substantially between a bearing inner race 160 and the bearing outer race 30.

Figure 2:
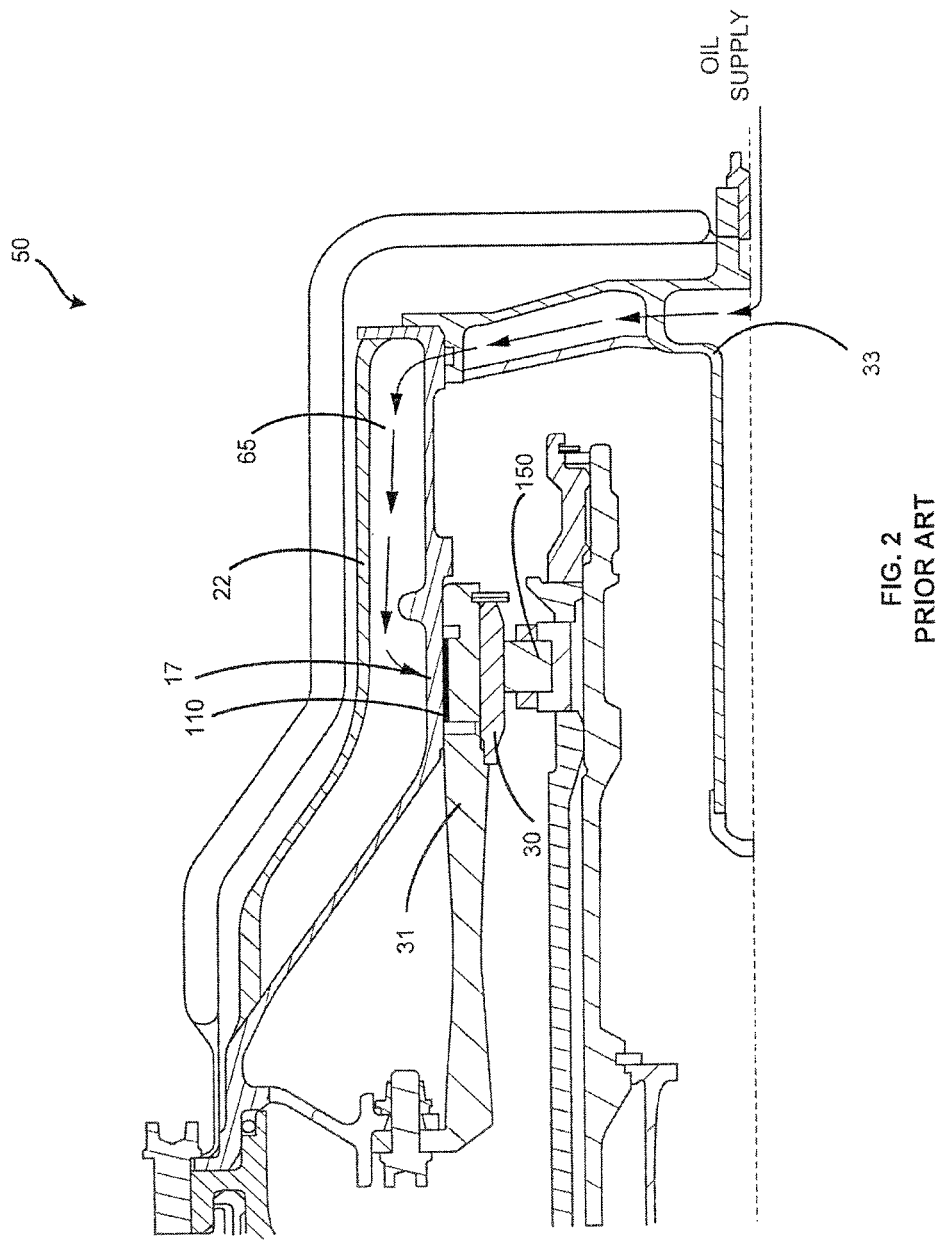
FIG. 2 depicts a cross-sectional view of a second traditional thin film oil damper delivery path.

Similar to the pathway 25 depicted in FIG. 1, FIG. 2 depicts another traditional thin film oil damper 110 lubrication delivery pathway 50. A supply of oil is delivered via a path 65 from an oil supply that travels through the outboard bearing support 22. This path 65 may travel from an oil reservoir through an oil supply tube 33, through the outboard bearing support 24 generally through a conduit 17, such a conduit machined in the outboard bearing support 24. As shown, the oil supply port and bearing outer race 30 may be separate parts. Oil may be supplied to the thin film damper 110 through a drilled hole (e.g. conduit 17) in the outboard bearing support 22.

As depicted in FIGS. 1-2, current bearing thin film oil dampers utilize an oil supply port external to a bearing outer race 30 and integral to an outboard bearing support 22, 24. This design involves complex and expensive castings, and sufficient radial design space to achieve the desired oil supply passages to the thin film oil damper 110.

Figure 3:
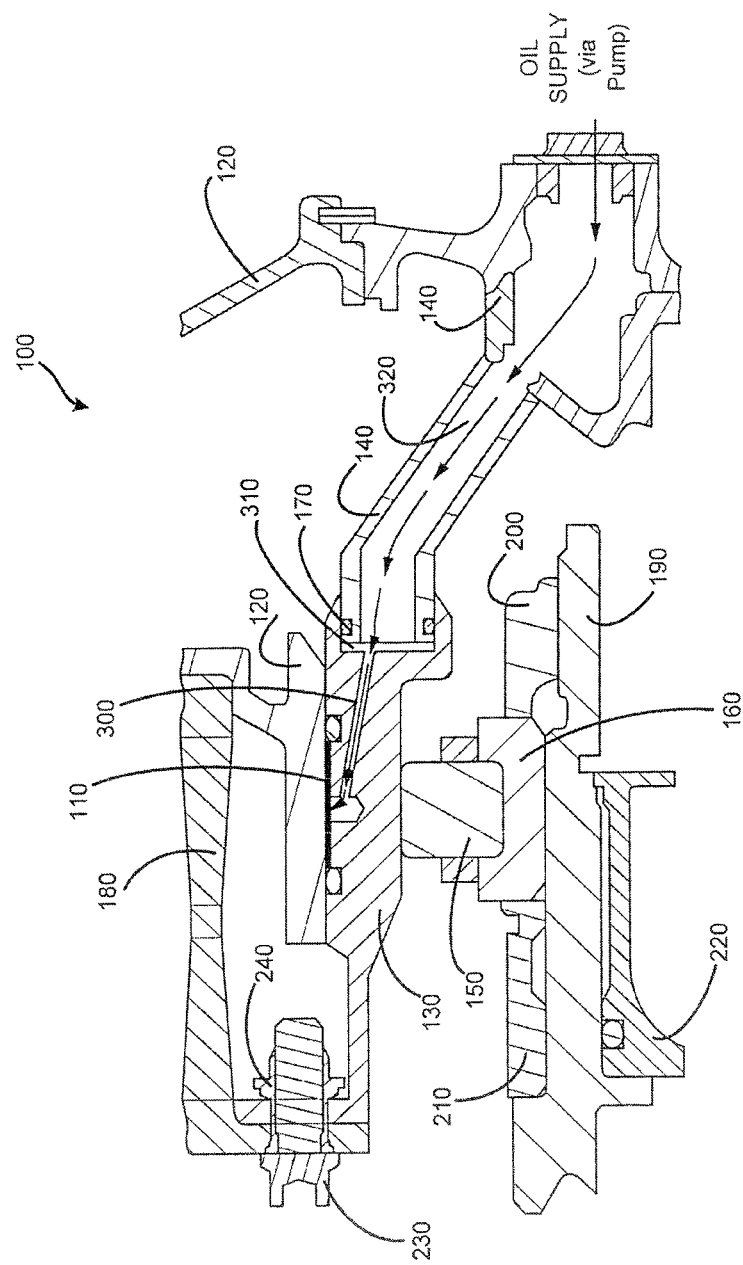
FIG. 3 depicts a cross-sectional view of an oil damper supply delivery path in accordance with various embodiments.
Figure 3B:
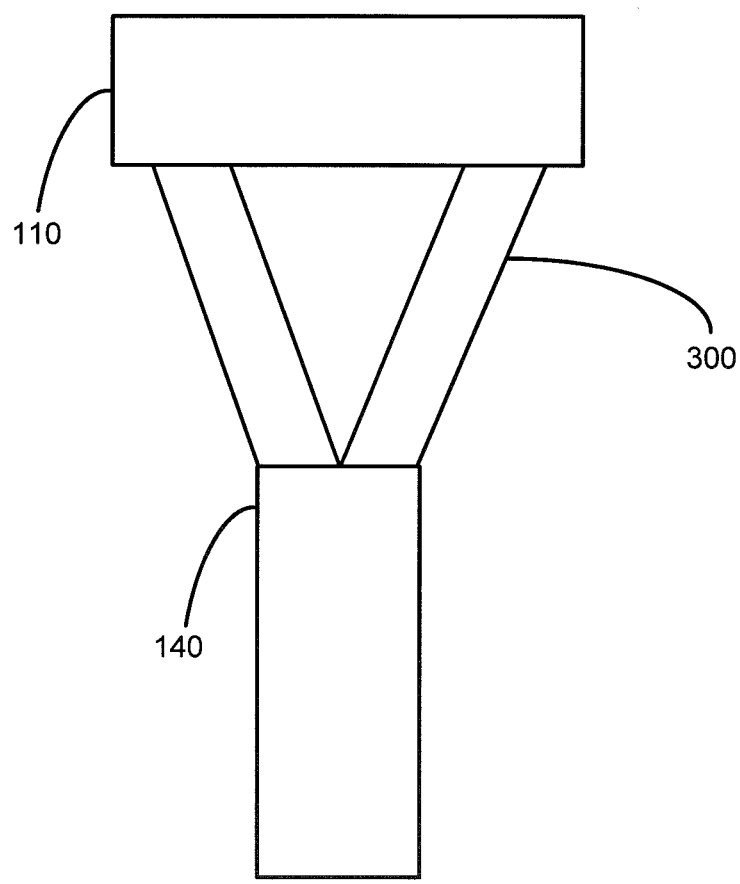

According to various embodiments, an improved damper supply delivery pathway 100 is disclosed. With reference to FIG. 3, in damper supply delivery pathway 100, an oil supply tube mates to the bearing outer race 130, not the bearing housing 120. Pressurization may be provided by an oil pump. Bearing outer race 130 may comprise internal oil flow circuit 300 (fluidic micro-circuit(s)) to supply oil from the oil supply tube 140 to the thin film damper 110. For instance, oil may be delivered via an oil path 320 from an oil reservoir to thin film damper 110. Oil path 320 may travel through an oil supply tube 140. Oil path 320 may traverse an oil supply tube bearing outer race union 310. Outer race union 310 may be a boss 145 (which is the type of connection depicted in FIG. 3) or port, plug 145 and/or the like as is desired. Oil may travel from the oil supply tube 140 to internal oil flow circuit(s) 300 to the thin film damper 110. According to various embodiments, the internal oil flow circuit 300 may comprise branching oil delivery pathways.

Figure 4:
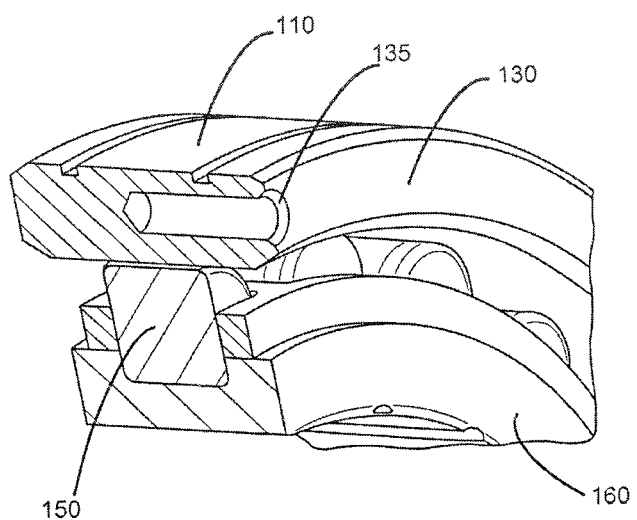
FIG. 4 depicts a perspective cut-away view of a bearing outer race internal port in accordance with various embodiments.
Figure 5:
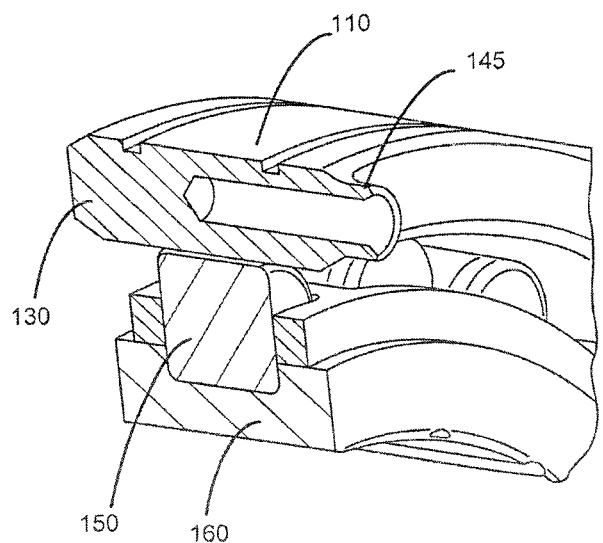
FIG. 5 depicts a perspective cut-away view of a bearing outer race bossed port in accordance with various embodiments.

As depicted in FIGS. 4 and 5, the plug 135 (or boss 145) and bearing outer race 130 may be one integral part. The bossed port may be a coupling point comprising relief from the surface. A port may be substantially flush with its surrounding surface. The oil supply tube 140, bearing housing 120 (may be referred to as a bearing support) and complete internal oil flow circuit 300 are not shown in FIGS. 4 and 5. The designs according to various embodiments described herein may result in a simpler, lighter, less expensive, and/or more radially compact bearing housing 120 as compared with traditional outboard bearing support (22, 24 as show in in FIGS. 1-2). A bearing outer race 130 consists of an oil supply port and integral oil supply passage(s) to supply oil to a thin film damper 110. The oil supply tube 140 mates to the bearing outer race 130 such that the oil supply tube 140 does not interfere with bearing radial or axial movement. An O-ring 170 may be configured to assist with the sealing of the oil supply tube 140, bearing outer race 130 union. The thin film damper 110 is consequentially supplied from the inboard film surface on the bearing outer race 130. Bearing outer race 130 may be configured to supply oil from oil supply tube 140 forward and/or aft of the bearing 150.

For the sake of completeness and to assist with orienting a viewer, FIG. 3 depicts a shaft 190, bearing nut 200, shaft spacer 210, and shaft oil plug 220. FIG. 3 further depicts bolt 230, nut 240, and a bearing centered spring 180.

According to various embodiments, the bearing outer race 130 may be formed through additive manufacturing. In this way, internal oil flow circuits 300 may be made with branching circuits and improved oil circuitry orientation. Through additive manufacturing, no internal machining or drilling may be utilized in the forming of internal oil flow circuits 300. Bearing outer race 130 may comprise single or multiple oil outer race unions/ports 310 (with any desired number of complementing oil supply tubes 140). As depicted in FIG. 3 and in accordance with various embodiments, in lubrication delivery pathway 100, oil is supplied to the thin film damper 110 inboard of the thin film fluidic damper 110, as opposed to an outboard oil supply.

A bearing outer race 130 having an oil supply union/port 310 with internal oil supply circuit 300 removes any need to have oil supply passages in and/or path through a bearing housing 120. This application allows for a radially compact and more simple assembly of bearing oil supply hardware. The integrated oil supply union/port 310 in a bearing outer race 130 provides a radially compact assembly of bearing 150 and bearing support hardware. This allows for more simple and less expensive bearing support castings since the oil supply passage for the thin film damper 110 is no longer integrated in the design of bearing supports 22, 24. Any application to which a medium is transferred to a thin film fluidic damper may benefit by traversing a path through a bearing race. The bearing assembly may be configured for use in aerospace applications.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Systems, methods and apparatus are provided herein. In the detailed description herein, references to "one embodiment", "an embodiment", "various embodiments", etc., indicate that the embodiment, described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover anon-exclusive inclusion, such that a process, method, article, or apparatus that comprises a list of elements does not include only those elements but may include other elements not expressly listed or inherent to such process, method, article, or apparatus.

What is claimed is:

1. A method of providing oil to a thin film damper comprising:
coupling a portion of the thin film damper to an oil supply via an inboard film surface, an internal oil flow circuit, and an oil supply tube, wherein the inboard film surface is on a bearing outer race and wherein the internal oil flow circuit is formed internal to the bearing outer race, the inboard film surface facing radially outward on the bearing outer race, the bearing outer race and the inboard film surface being located radially outward from a bearing, the oil supply being located radially inward from the bearing, the bearing being configured to rotate about a bearing axis, wherein the internal oil flow circuit permits oil to flow radially outward from the oil supply tube to the thin film damper, the internal oil flow circuit comprising at least one of a port, a bossed port or a plug, the at least one of the port, the bossed port or the plug being configured to mate with the oil supply tube that is parallel to the bearing axis, wherein another portion of the oil supply tube is inclined relative to the bearing axis wherein the inboard film surface portion of the thin film damper, the internal oil flow circuit, the bearing outer race and the at least one of the port, the bossed port or the plug are formed as a single integral part, the oil supply tube being located at least partially radially inward from the bearing.

2. The method of claim 1, further comprising coupling the oil supply tube to the internal oil flow circuit, wherein the coupling is configured to couple the internal oil flow circuit to the oil supply.

3. The method of claim 2, further comprising positioning a seal between the oil supply tube and the internal oil flow circuit.

4. The method of claim 1, wherein an oil pump is configured to deliver oil from the oil supply to the thin film damper.

5. The method of claim 1, wherein the internal oil flow circuit comprises a plurality of branching oil delivery pathways.

6. The method of claim 1, wherein the bearing outer race is separate part from a bearing housing.

7. A bearing assembly comprising:
a thin film damper positioned between a bearing housing and a bearing outer race, wherein oil is supplied from an oil supply to the thin film damper via an inboard film surface, an internal oil flow circuit, and an oil supply tube, wherein the inboard film surface is on the bearing outer race, the inboard film surface facing radially outward on the bearing outer race, the bearing outer race and the inboard film surface being located radially outward from a bearing, the oil supply being located radially inward from the bearing, the bearing being configured to rotate about a bearing axis, wherein the internal oil flow circuit permits oil to flow radially outward from the oil supply tube to the thin film damper only, wherein the internal oil flow circuit is integral to the bearing outer race, the internal oil flow circuit comprising at least one of a port, a bossed port or a plug, the at least one of the port, the bossed port or the plug being configured to mate with the oil supply tube that is parallel to the bearing axis, wherein another portion of the oil supply tube is inclined relative to the bearing axis wherein the inboard film surface portion of the thin film damper, the internal oil flow circuit, the bearing outer race and the at least one of the port, the bossed port or the plug are formed as a single integral part, the oil supply tube being located at least partially radially inward from the bearing.

8. The bearing assembly of claim 7, further comprising the oil supply tube configured to couple the internal oil flow circuit to an oil supply.

9. The bearing assembly of claim 7, further comprising a seal between the oil supply tube and the internal oil flow circuit.

10. The bearing assembly of claim 7, wherein an oil pump is configured to deliver oil from the oil supply to the thin film damper.

11. The bearing assembly of claim 7, wherein the internal oil flow circuit comprises a plurality of branching oil delivery pathways.

12. The bearing assembly of claim 7, wherein the bearing outer race is a separate part from the bearing housing.

13. The bearing assembly of claim 7, further comprising a rolling bearing.

14. The bearing assembly of claim 7, further comprising a bearing inner race.

* * * * *